United States Patent
Yahagi et al.

(10) Patent No.: US 7,278,577 B2
(45) Date of Patent: *Oct. 9, 2007

(54) IMAGE INPUT SYSTEM

(75) Inventors: Kouichi Yahagi, Takasaki (JP);
Masumi Kasahara, Takasaki (JP);
Hiroki Nakajima, Takasaki (JP)

(73) Assignees: Renesas Technology Corp., Tokyo (JP); Hitachi Tohbu Semiconductor, Ltd., Takasaki-shi (JP)

( * ) Notice: Subject to any disclaimer, the term of this patent is extended or adjusted under 35 U.S.C. 154(b) by 65 days.

This patent is subject to a terminal disclaimer.

(21) Appl. No.: 10/823,642

(22) Filed: Apr. 14, 2004

(65) Prior Publication Data

US 2004/0196392 A1 Oct. 7, 2004

Related U.S. Application Data

(63) Continuation of application No. 10/200,162, filed on Jul. 23, 2002, now Pat. No. 6,783,073, which is a continuation of application No. 09/529,651, filed on Apr. 18, 2000, now Pat. No. 6,499,663.

(51) Int. Cl.
*G06F 7/10* (2006.01)
*H03K 3/00* (2006.01)
*G06K 7/10* (2006.01)
*G06K 15/12* (2006.01)
*G06K 7/14* (2006.01)
*H03G 3/32* (2006.01)
*H04N 5/20* (2006.01)

(52) U.S. Cl. ................... 235/462.28; 235/462.29; 235/462.41; 235/462.26; 235/454; 348/255

(58) Field of Classification Search .......... 235/462.28, 235/462.29, 462.41, 462.26, 454; 348/222.1, 348/241, 230.1, 251, 243, 255
See application file for complete search history.

(56) References Cited

U.S. PATENT DOCUMENTS

| | | | |
|---|---|---|---|
| 5,025,318 A | * | 6/1991 | Nagura ................. 348/316 |
| 5,191,435 A | | 3/1993 | Tsunekawa et al. |
| 5,396,288 A | * | 3/1995 | Tsugita et al. .......... 348/229.1 |

(Continued)

FOREIGN PATENT DOCUMENTS

JP 07-107390 4/1995

(Continued)

*Primary Examiner*—Daniel Walsh
(74) *Attorney, Agent, or Firm*—Mattingly, Stanger, Malur & Brundidge, P.C.

(57) ABSTRACT

An image input system includes a solid state image pickup device and a preprocessor for performing correlated double sampling amplification on an output of the image pickup device and outputting a video signal. The preprocessor has a correlated double sampling amplifier for outputting signal information corresponding to a difference voltage between the black level in a feedthrough period of the image pickup device and a signal level in a charge signal output period; and an offset cancelling circuit for cancelling an offset voltage corresponding to the difference voltage in a state where the image pickup device is optically interrupted to the input terminal of the correlated double sampling amplifier. The correlated double sampling amplifier cancels out the offset voltage and the offset cancelling voltage as signal components of polarities opposite to each other, so that circuits following the correlated double sampling amplifier are not influenced by the offset voltage.

1 Claim, 9 Drawing Sheets

U.S. PATENT DOCUMENTS

| | | | |
|---|---|---|---|
| 5,691,821 A * | 11/1997 | Hieda et al. | 348/217.1 |
| 5,736,886 A * | 4/1998 | Mangelsdorf et al. | 327/310 |
| 5,737,033 A * | 4/1998 | Masuda | 348/678 |
| 5,757,440 A * | 5/1998 | Mangelsdorf | 340/573.4 |
| 5,889,553 A | 3/1999 | Kino et al. | |
| 5,912,703 A | 6/1999 | Tamayama | |
| 6,072,527 A | 6/2000 | Iwai | |
| 6,140,989 A | 10/2000 | Kato | |
| 6,181,368 B1 | 1/2001 | Takahashi et al. | |
| 6,201,573 B1 | 3/2001 | Mizuno | |
| 6,211,914 B1 | 4/2001 | Kubo | |
| 6,477,200 B1 | 11/2002 | Agazzi et al. | |
| 6,587,144 B1 * | 7/2003 | Kim | 348/241 |
| 6,617,567 B2 | 9/2003 | Mukherjee et al. | |
| 6,783,073 B2 * | 8/2004 | Yahagi et al. | 235/462.28 |
| 6,791,607 B1 * | 9/2004 | Bilhan et al. | 348/243 |
| 6,940,548 B2 * | 9/2005 | Ying et al. | 348/241 |
| 2005/0062855 A1 * | 3/2005 | Tani et al. | 348/222.1 |

FOREIGN PATENT DOCUMENTS

| | | |
|---|---|---|
| JP | 2000-287137 | 10/2000 |

* cited by examiner

OUTPUT TIMING OF SOURCE FOLLOWER OUTPUT CIRCUIT

IMAGE INPUT SYSTEM

This is a continuation application of U.S. Ser. No. 10/200, 162, filed Jul. 23, 2002, now U.S. Pat. No. 6,783,073 which is a continuation application of U.S. Ser. No. 09/529,651, filed Apr. 18, 2000, now U.S. Pat. No. 6,499,663.

TECHNICAL FIELD

The present invention relates to an image input system for optically inputting an image by using a solid state image pickup device of an X-Y address system using MOS transistors, a solid state image pickup device of a charge transfer system using a CCD (Charge Coupled Device), or the like for photoelectric conversion and charging. More particularly, the invention relates to a technique of lessening an influence of noise components of a signal outputted from a solid state image pickup device, which is exerted on a process of a correlated double sampling method at a post stage or the like and relates to, for example, a technique which is effective when applied to a video camera, a digital still camera or the like.

BACKGROUND ART

A CCD can convert an optical image formed according to the intensity of irradiated light into a charge signal according to the intensity of the light and can move the charge signal by sequentially applying pulses to a number of transfer gates so as to sequentially move the charge signal through the wells of a potential formed on the surface of a semiconductor substrate. The charge signal (carrier) can be moved by, for example, controlling a number of transfer gates (insulating gates) arranged in parallel in the CCD by pulse signals of two phases which are opposite to each other. An example of an outputting unit for outputting the transferred charge signal is a circuit called a GCD (Gated Charge Detector). An outputting unit of the GCD type has a floating capacitive element precharged by a precharge MOS transistor every cycle of the charge transfer by the pulse signals. A change in the potential of the floating capacitive element due to a flow of a charge signal from the CCD to the precharged floating capacitive element is detected by a source follower output circuit. When the gate capacitance of an input MOS transistor of the source follower output circuit is C3 and the capacitance of the floating capacitive element is C0, an output voltage of the source follower output circuit is generally reduced only by Qs/(C3+C0) (where Qs is a negative charge).

An outputting operation by the outputting unit is performed in: a period of reset by the precharged MOS transistor (period in which the final transfer gate of the solid state image pickup device is in an OFF state and precharging is performed by turning on the precharge MOS transistor); a feedthrough period (period in which the final transfer gate of the solid state image pickup device and the precharge MOS transistor are turned off and the precharged charges are re-distributed to the floating capacitor and the input gate capacitor of the source follower input MOS transistor for stabilization); and a charge signal output period (period in which the precharge MOS transistor is in an off state and the charge signal is outputted from the final transfer gate of the solid state image pickup device to the floating capacitive element).

The charge signal outputted from the outputting unit includes capacitive noises such as 1/f noise which occurs in the source follower input MOS transistor and reset noise which occurs when the floating capacitive element or the like is reset every transfer cycle. Since the capacitive noises occur at low frequencies, in order to reduce the noises, a preprocessor for amplifying an output signal of the solid state image pickup device by a correlated double sampling method can be adopted. A correlated double sampling amplifier to which the correlated double sampling method is applied generates a signal corresponding to a difference voltage between the output signal level (black level) in the feedthrough period and the output signal level in the charge signal output period.

Further, a feedback clamping circuit is disposed at a post stage of the correlated double sampling amplifier. The feedback clamping circuit samples a difference voltage between the signal level (black level) in the feedthrough period and the signal level in the signal charge output period (this signal level is particularly called a reference signal level in a state where a photoreceiver of the solid state image pickup device is optically interrupted) in a state where the photoreceiver of the solid state image pickup device is optically interrupted. The feedback clamping circuit adds a feedback voltage to an output voltage of the correlated double sampling amplifier so that the sampled difference voltage becomes constant. Consequently, a video signal using the black level and the difference voltage as references is generated by the preprocessor during a predetermined charge transfer period (video period) in the horizontal scan period and the video signal is supplied to a signal processor at some later stage.

The inventors of the present invention have examined the solid state image pickup device and the preprocessor as described above and clarified the following. Due-to parasitic capacitance between the gate and source of the precharge MOS transistor and parasitic capacitance (output node parasitic capacitance) between the final transfer gate of the solid state image pickup device and the output node, when the outputting operation of the outputting unit shifts from the feedthrough period to the charge signal output period, a change in a pulse signal for controlling the charge transfer causes an undesirable change in the level of the output node via the output node parasite capacitance. The amount of the undesirable level change is determined mainly by the ratio between the output node parasite capacitance and the floating capacitance. The inventors have found that since the capacitance of the floating capacitive element tends to be reduced in order to increase the detection sensitivity of the outputting unit, the output node parasite capacitance relatively increases and it causes an increase in the undesirable level change in the charge signal output period. The undesirable level change due to the capacitive noise causes an undesirable offset voltage which is outputted from the source follower output circuit in the charge signal output period.

The inventors have found that when the offset voltage increases, the amount of the feedback control performed by the feedback clamping circuit increases and it is feared that the circuit operation cannot follow it. When the feedback control cannot follow, the reference of the video signal changes at random on the horizontal scan unit basis and it causes unevenness in an input image. When the conductance of transistors constructing the feedback clamping circuit is increased in order to deal with the problem, it brings about an increase in a chip occupying area and power consumption. Especially, under the circumstances that the operation source voltage is decreased to realize low power consumption, the necessary feedback control amount cannot be satisfied. The following problem has been also made clear by the inventors. When the preprocessor including the correlated double sampling amplifier and the feedback clamping circuit is provided as a preprocessing LSI formed as a semiconductor integrated circuit, the preprocessing LSI cannot be generally used for a solid state image pickup device having a relatively large capacitive noise component.

It is an object of the invention to provide an image input system capable of inputting an image with high quality even if the capacitive noise characteristic of a solid state image pickup device used is not good.

Another object of the invention is to provide an image input system capable of preventing a situation such that a feedback clamping control cannot follow by an influence of an offset voltage included in an output signal of a solid state image pickup device.

The above and other objects and novel features of the present invention will become apparent from the following description and the accompanying drawings.

DISCLOSURE OF INVENTION

An image input system according to the invention comprises a solid state image pickup device and a preprocessor for performing correlated double sampling amplification on an output signal of the solid state image pickup device and outputting a video signal. The preprocessor includes a correlated double sampling amplifier for outputting signal information corresponding to a difference voltage between a black level in a feedthrough period of the solid state image pickup device and a signal level in a charge signal output period; and offset cancelling means for applying an offset cancelling voltage for cancelling an offset voltage corresponding to the difference voltage between the black level in the feedthrough period of the solid state image pickup device in the state where the solid state image pickup device is optically interrupted and the signal level in the charge signal output period to an input terminal of the correlated double sampling amplifier. The correlated double sampling amplifier performs cancellation between the offset voltage and the offset cancelling voltage as signal components of polarities opposite to each other. The image input system can further comprise a data processor for receiving the video signal outputted from the preprocessor and performing an image signal process.

The offset voltage due to the capacitive noise component included in the output signal of the solid state image pickup device and the offset cancelling voltage applied to the input terminal of the correlated double sampling amplifier are cancelled out by each other as signal components of polarities opposite to each other by the correlated double sampling amplifier. Consequently, the offset voltage is removed or reduced from the signal information obtained by the solid state image pickup device. Even when the capacitive noise characteristic of the solid state image pickup device is not good, the image input can be performed with high quality.

In an image input system in a further detailed mode according to the invention, the solid state image pickup device has a GCD type outputting unit. For example, the outputting unit is a circuit which has a floating capacitive element precharged by a precharge MOS transistor every output cycle of signal charges and which detects a change in the potential of the floating capacitive element due to the flow of the charge signal to the precharged floating capacitive element by a source follower output circuit. The preprocessor further comprises: a gain control circuit for adjusting the gain of an output signal of the correlated double sampling amplifier; an A/D converter for converting an output of the gain control circuit, which is an analog signal, to a digital signal and outputting the digital signal; and correcting means for receiving an output signal of the A/D converter and performing a feedback clamping control to set an output-signal obtained from the A/D converter to a constant level on the basis of a difference voltage between the black level in the feedthrough period of the solid state image pickup device in the state where the solid state image pickup device is optically interrupted and the signal level in the charge signal output period.

The correcting means can comprise: a feedback clamping voltage generating circuit for detecting the level of an output signal of the A/D converter, which corresponds to a difference voltage between the black level in the feedthrough period in the state where the solid state image pickup device is optically interrupted and the signal level in the charge signal output period and generating a feedback clamping voltage on the basis of the output signal level detected; and first switching means for selectively applying the generated feedback clamping voltage to an output of the correlated double sampling amplifier.

The correlated double sampling amplifier comprises: a first sampling circuit for generating a difference voltage between the black level in the feedthrough period of the solid state image pickup device and the signal level in the charge signal output period; a second sampling circuit for generating a reference voltage for the difference voltage of the first sampling circuit; and a differential amplifier for differential amplifying the voltages generated by the first and second sampling circuits.

The offset cancelling means may comprise as a first mode: offset cancelling voltage generating means for detecting an offset voltage on the basis of an output of the A/D converter in a state where the solid state image pickup device is optically interrupted and generating an offset cancelling voltage on the basis of the detected offset voltage; and second switching means for selectively applying the generated offset cancelling voltage to the reference voltage of the second sampling circuit. Consequently, it is sufficient for the correcting means to execute a feedback clamping control on a signal obtained by eliminating an offset voltage from an output signal of the solid state image pickup device by the offset cancelling voltage. Since it is not necessary to include the amount of signals related to the offset voltage in the amount of a correction control performed by the correcting means, the control amount by the correcting means can be reduced. Even when the correcting means is operated by a low voltage power source, the feedback clamping control can follow satisfactorily.

The offset cancelling means can comprise as a second mode: a voltage detecting circuit for detecting a signal outputted from the differential amplifier in accordance with the difference voltage between the black level in the feedthrough period in the state where the solid state image pickup device is optically interrupted and the signal level in the charge signal output period; offset voltage generating means for generating an offset cancelling voltage by a difference voltage between the voltage signal detected by the voltage detecting circuit and a reference voltage signal; and second switching means for selectively adding the generated offset cancelling voltage to the reference voltage of the second sampling circuit. In the second mode, in a manner similar to the first mode, the offset voltage can be automatically cancelled by the feedback control. Further, as compared with the first mode, the circuit scale of the offset cancelling means can be reduced more.

As a third mode, the offset cancelling means may comprise: means for receiving control information for designating the level of the offset cancelling voltage in the state where the solid state image pickup device is optically interrupted from the outside; offset cancelling voltage generating means for generating the offset cancelling voltage on the basis of the received control information; and second switching means for selectively adding the generated offset cancelling voltage to the reference voltage of the second sampling circuit. Although the means does not perform the feedback control, the voltage detecting circuit is unnecessary. Thus, the circuit scale can be reduced.

As a fourth mode, the offset cancelling means may comprise: an external terminal to which the offset cancelling voltage is applied; a buffer amplifier whose input is coupled to the external terminal; and switching means for selectively adding the offset cancelling voltage outputted from the buffer amplifier to the reference voltage of the second sampling circuit. According to the means, the offset cancelling voltage can be received directly from the outside. In the case of adopting the offset cancelling means according to the third and fourth modes, in order to grasp whether the control information or offset cancelling voltage inputted from the outside is a proper value or not, it is sufficient to include an external monitor terminal by which the feedback clamping voltage by the correcting means can be monitored from the outside in the preprocessor and to determine the control information or offset cancelling voltage so that the feedback clamping voltage becomes a specified voltage.

BEST MODE FOR CARRYING OUT THE INVENTION

Figure 1:
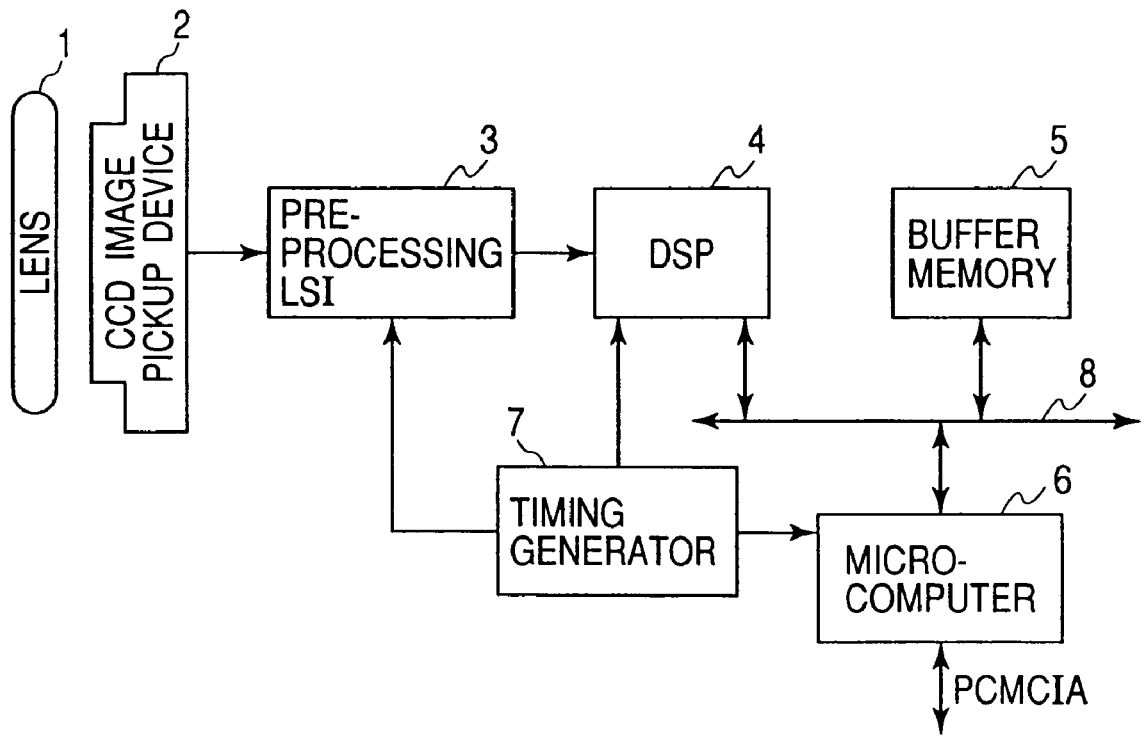
FIG. 1 is a block diagram showing an embodiment of an image input system according to the invention.

FIG. 1 shows an embodiment of an image input system according to the invention. The image input system shown in the diagram is applied to a digital video camera, a digital still camera, a digital endoscope, and the like and comprises, as main components, a lens 1, a CCD image pickup device 2, a preprocessor (preprocessing LSI) 3 formed as a semiconductor integrated circuit, a DSP (Digital Signal Processor) 4, a buffer memory 5, a microcomputer 6, and a timing generator 7. Each of the DSP 4 and the microcomputer 6 is an example of a data processor.

The CCD image pickup device 2 comprises, for example, a photoreceiver having a photoelectric converting function for converting an optical image to a signal charge, a plurality of vertical transfer CCDs for vertically transferring the signal charge photoelectrically converted by the photoreceiver every horizontal line, a horizontal transfer CCD unit for sequentially transferring the charges of each line sent from each of the vertical transfer CCDs, and an outputting unit for converting the signal charge transferred from the horizontal transfer CCD to a signal voltage and outputting the signal voltage. Such a CCD image pickup device is an interline type device.

The preprocessing LSI 3 amplifies the voltage signal outputted from the outputting unit by a correlated double sampling amplifier, controls the gain of the amplified signal, and outputs the gain controlled signal to the DSP 4. The preprocessing LSI 3 performs both a feedback clamping control on an output of the correlated double sampling amplifier and a control of cancelling an offset voltage with respect to the voltage signal outputted from the outputting unit. The offset voltage cancelling control and the feedback clamping control will be described in detail hereinlater.

The DSP 4 performs an image signal process such as a filtering process on the video signal outputted from the preprocessing LSI 3. The buffer memory 5 is used to temporarily store image data subjected to an image signal process or used as a working area of the microcomputer 6.

The microcomputer 6 is a circuit for controlling the whole system. The microcomputer 6 issues an image signal process command to the DSP 4 via the bus 8, controls an access to the buffer memory 5, and performs a PC card interface control by a PCMCIA interface. The timing generator 7 supplies various operation clock signals and timing signals to the preprocessor 3, DSP 4, and microcomputer 6.

Figure 2:
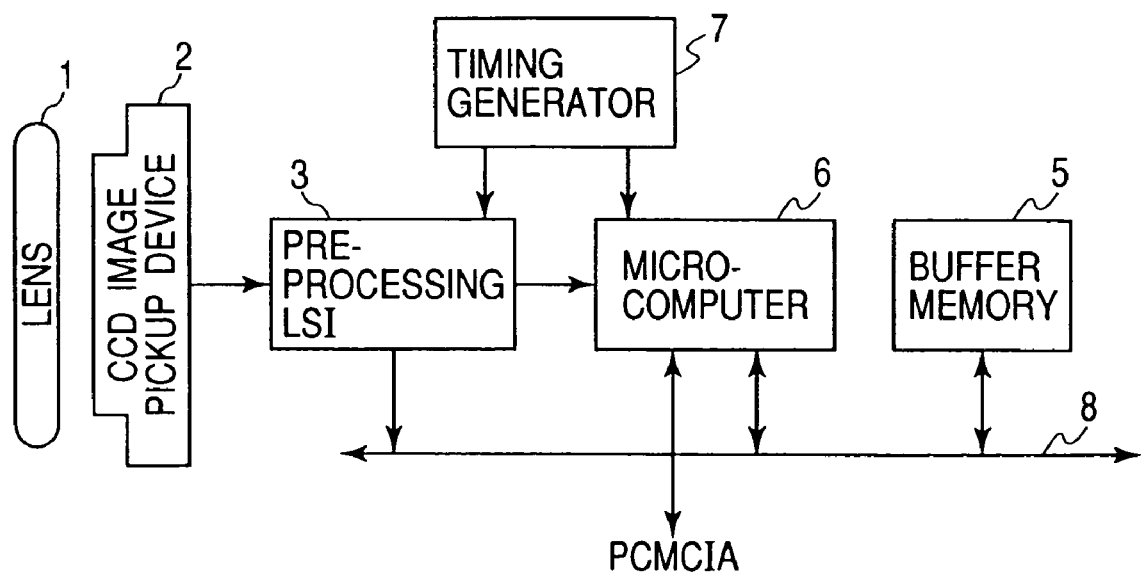
FIG. 2 is a block diagram showing another embodiment of the image input system according to the invention.

The timing generator 7 may be provided in the microcomputer 6. The DSP 4 may be provided in the microcomputer 6 together with a central processing unit. When the data processing ability of the central processing unit built in the microcomputer 6 is high, as shown in FIG. 2 as an example, in place of the DSP 4, the central processing unit built in the microcomputer 6 can execute the image signal process in accordance with an operation program.

Figure 3:
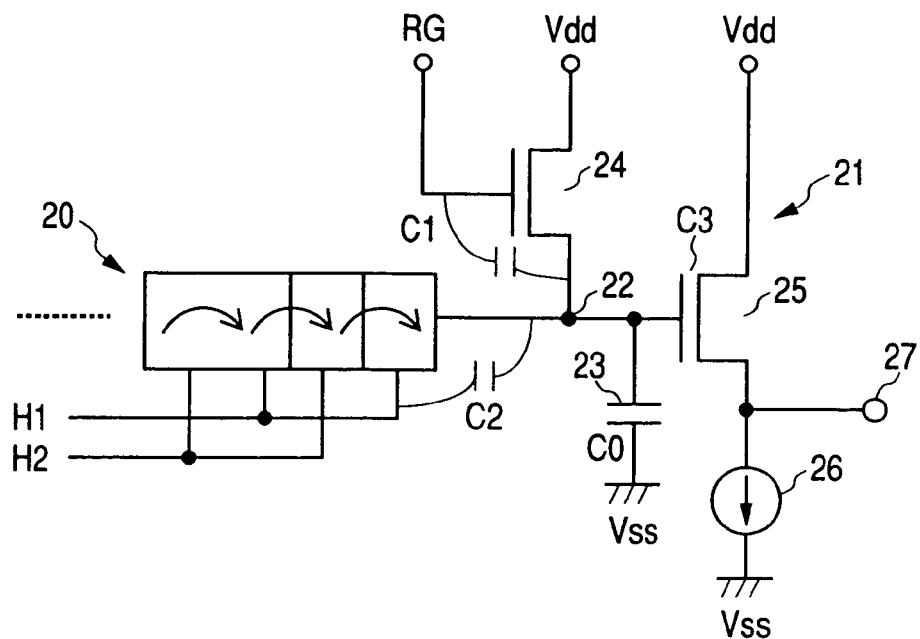
FIG. 3 is a circuit diagram showing a part of a CCD image pickup device as an example.

FIG. 3 shows an example of the CCD image pickup device 2. In the diagram, reference numeral 20 denotes a horizontal transfer CCD unit and the photoreceiver and a vertical transfer CCD unit (both not shown) are disposed in the direction which perpendicularly crosses the horizontal transfer CCD unit. The horizontal transfer CCD unit 20 is constructed by MOS capacitors which are arranged in series. Each of transfer pulse signals H1 and H2 of phases opposite to each other is supplied to the transfer gates of the MOS capacitors every other transfer gate. The horizontal transfer CCD unit 20 sequentially transfers the signal charges to an output node 22 synchronously with a change in the transfer pulse signals H1 and H2.

The charge signal transferred from the horizontal transfer CCD unit 20 is converted to a voltage signal by a GCD type outputting unit 21. The outputting unit 21 has a floating capacitive element 23 coupled to the output node 22 of the horizontal transfer CCD unit 20, a precharge MOS transistor 24 for precharging the floating capacitive element 23 every cycle of the charge transfer by the pulse signals H1 and H2, and a source follower input MOS transistor 25 whose gate electrode is coupled to the output node 22. The source follower input MOS transistor 25 and a current source 26 construct a source follower output circuit and the source of the MOS transistor 25 serves as an output terminal 27. In FIG. 3, RG denotes a reset pulse; C0 the capacitance of the floating capacitive element 23; C1 parasitic capacitance between the gate and source of the MOS transistor 24; C2 parasitic capacitance between the output node 22 of the horizontal transfer CCD unit 20 and the transfer gate which receives the transfer pulse signal H1; C3 input gate capacitance of the MOS transistor 25; Vdd a power supply voltage; and Vss a ground voltage. The source follower output circuit of the outputting unit 21 is not limited to one stage. A plurality of stages may be connected in series.

Figure 4:
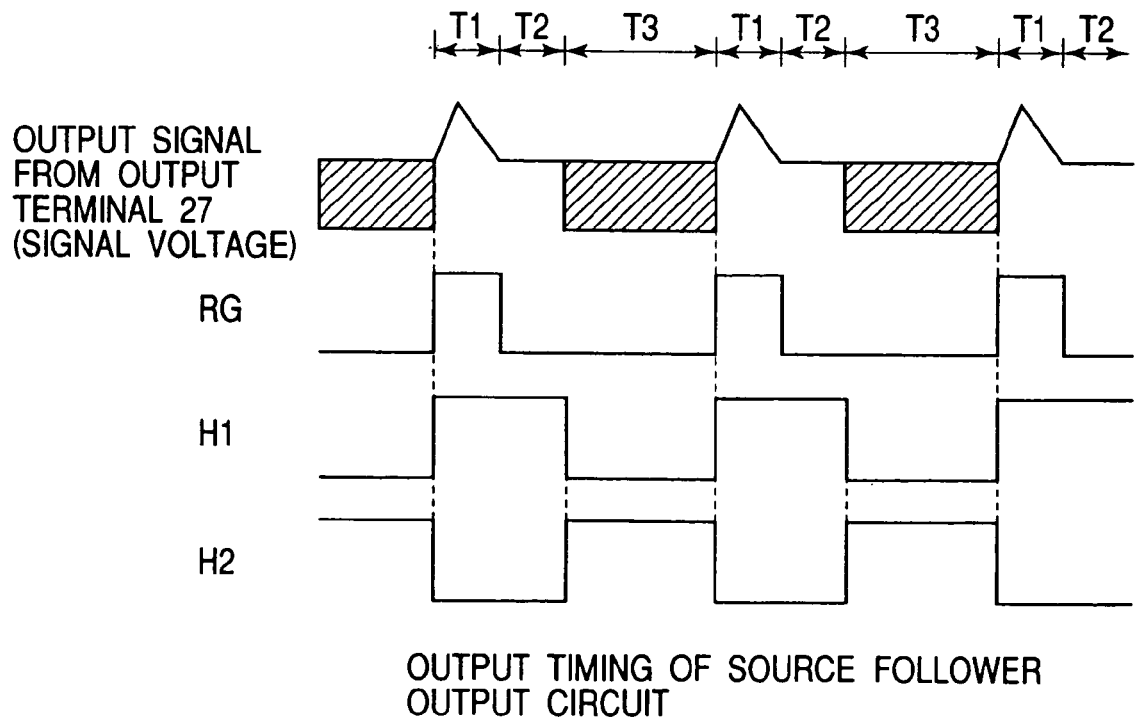
FIG. 4 is a waveform chart showing an example of output operation timing of an outputting unit of the CCD image pickup device.

FIG. 4 shows an example of the output operation timing of the outputting unit 21. The transfer pulse signals H1 and H2 transfer the charge signal pixel by pixel to the post stage when they are at the low level. The reset pulse RG turns on the precharge MOS transistor 24 when it is at the high level.

The output operation of the outputting unit 21 is performed in a reset period T1, a feedthrough period T2, and a charge signal output period T3. In the reset period T1, the final transfer gate of the horizontal transfer CCD unit 20 is turned off by the high-level transfer pulse signal H1. By turning on the precharge MOS transistor 24 by the high-level reset pulse signal RG in such a state, the output node 22 and the floating capacitive element 23 are precharged. The parasitic capacitances C1 and C2 and the gate input capacitance C3 are also charged.

In the feedthrough period T2, both of the final transfer gate of the horizontal transfer CCD unit 20 and the precharge MOS transistor 24 are turned off, the output node 22 enters a floating state, and the precharged charges are re-distributed to the floating capacitive element 23, the input gate capacitance C3 of the source follower input MOS transistor 25 and the like for stabilization. The voltage level obtained at the output terminal 27 in the feedthrough period T2 is called the black level.

In the charge signal output period T3, the precharge MOS transistor 24 is maintained in the off state and the charge signal is outputted from the final transfer gate of the horizontal transfer CCD unit 20 to the output node 22. The charge signal from the horizontal transfer CCD unit 20 flows in the precharged floating capacitive element 23 and the like and, accordingly, a change in the potential of the output node 22 appears at the output terminal 27 of the source follower output circuit.

In contrast to the black level in the feedthrough period T2, the signal level in the charge signal output period T3 is generally lowered only by $Qs/(C0+C3+C1+C2)$ where Qs denotes a negative charge.

The voltage signal obtained at the output terminal 27 includes capacitive noises such as 1/f noise which occurs in the source follower input MOS transistor 25 and reset noise which occurs when the precharge MOS transistor 24 is reset every transfer period. Paying attention especially to the parasitic capacitance C2, the inventors of the present invention have disclosed that when the output operation of the outputting unit 21 shifts from the feedthrough period T2 to the charge signal output period T3, a change in the transfer pulse signal H1 causes an undesirable change in the level of the output node 22 via the parasitic capacitance C2. The amount of the undesirable level change is determined mainly by the ratio between the parasitic capacitance C2 and the floating capacitance C0. Since the capacitance C0 of the floating capacitive element 23 tends to be reduced in order to increase the detection sensitivity of the outputting unit 21, the parasitic capacitance C2 is relatively large. It makes the undesirable level change increase in the charge signal output period T3. Such an undesirable level change due to the capacitive noise components causes an undesirable offset voltage outputted from the source follower output circuit 21 in the charge signal output period. A new function of cancelling the offset voltage is added to the preprocessing LSI 3.

Figure 5:
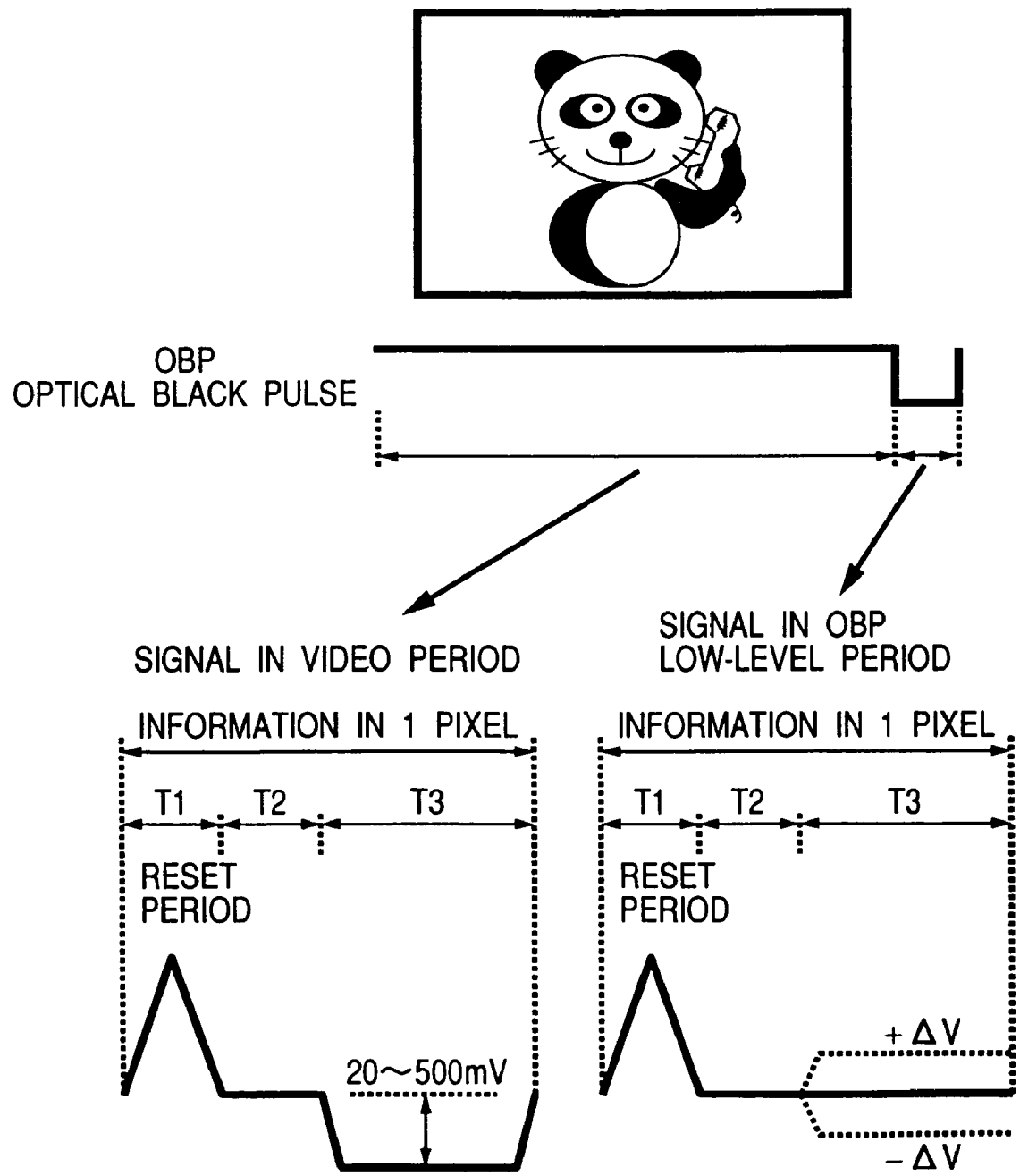
FIG. 5 is an explanatory diagram of an offset voltage.

The offset voltage will now be explained more. For example, in image input scanning performed on an image shown in FIG. 5, an OBP (Optical Black Pulse) serves as a sync signal in the horizontal scan (horizontal sync signal) and the CCD image pickup device 2 picks up an optical image in the high level period of the horizontal sync signal OBP (which is a period similar to a video period in the raster scan and is also called a video period). The low level period of the horizontal sync signal OBP is a period in which the photoreceiver is optically interrupted (the period is similar to a horizontal retrace line period in the raster scan and is also called a reference period).

During the video period, the voltage signal level in the charge signal output period T3 has a potential difference of, for example, a range from 20 to 500 mV with respect to the black level. On the other hand, during the reference period, since the photoreceiver is optically interrupted, the voltage signal level during the charge signal output period T3 is theoretically supposed to coincide with the black level. In practice, however, since the capacitive noise components are included, the voltage signal level during the charge signal output period T3 in the reference period is deviated from the black level only by an amount of the offset voltage ±ΔV. Such an offset voltage is included in the voltage signal level during the charge signal output period T3 also in the video period.

Figure 6:
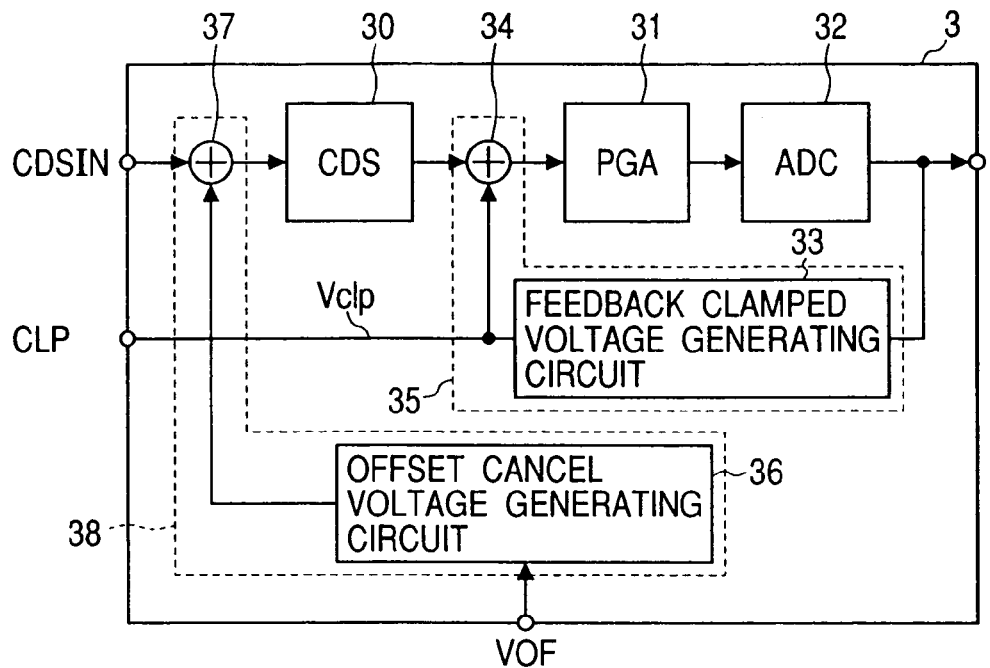
FIG. 6 is a block diagram showing an example of a preprocessing LSI.

FIG. 6 shows an example of the preprocessing LSI 3. The preprocessing LSI 3 comprises: a correlated double sampling amplifier (CDS) 30 that receives a voltage signal from the outputting unit 21 of the CCD image pickup device 2; a gain control circuit (PGA) 31 for adjusting the gain of an output signal of the correlated double sampling amplifier 30; an A/D converter (ADC) 32 for converting an analog signal as an output of the gain control circuit 31 to a digital signal and outputting the digital signal; a correcting means 35 having a feedback clamping voltage generating circuit 33 and a first addition switch circuit 34; and an offset cancelling means 38 having an offset cancelling voltage generating circuit 36 and a second addition switch circuit 37.

The gain control is instructed to the PGA 31 by, for example, the microcomputer 6 every vertical scan period. An operation of controlling the correcting means 35 is, although not limited, performed every reference period.

The feedback clamping voltage generating circuit 33 detects the level of the output signal of the ADC 32 in a state where the CCD image pickup device 2 is optically interrupted and generates a feedback clamping voltage Vclp on the basis of the detected output signal level. The first addition switching circuit 34 selectively adds the feedback clamping voltage Vclp generated by the feedback clamping voltage generating circuit 33 to an output of the CDS 30. Consequently, the correcting means 35 can perform a feedback clamping control to make the level of the output signal obtained from the A/D converter 32 constant in the state where the CCD image pickup device 22 is optically interrupted. For example, when the ADC 32 has conversion accuracy of 10 bits, the (n)th value can be adopted from the minimum output value of the ADC 32 as the constant level.

The offset cancelling voltage generating circuit 36 generates an offset cancelling voltage on the basis of information inputted from the outside (VOF). The second addition switching circuit 37 applies the generated offset cancelling voltage to the input terminal of the CDS 30.

The offset cancelling means 38 eliminates the offset voltage from the output signal of the CCD image pickup device 2 by using the offset cancelling voltage. It is sufficient for the correcting means 35 to perform the feedback clamping control on the signal from which the offset voltage has been eliminated. An amount of the correction control performed by the correcting means 35 does not therefore have to include a signal amount related to the offset voltage, so that the control amount of the correcting means 35 can be reduced. Even when the correcting means 35 or the like is operated by a low voltage power source, it can satisfactorily follow the feedback clamping control.

Figure 7:
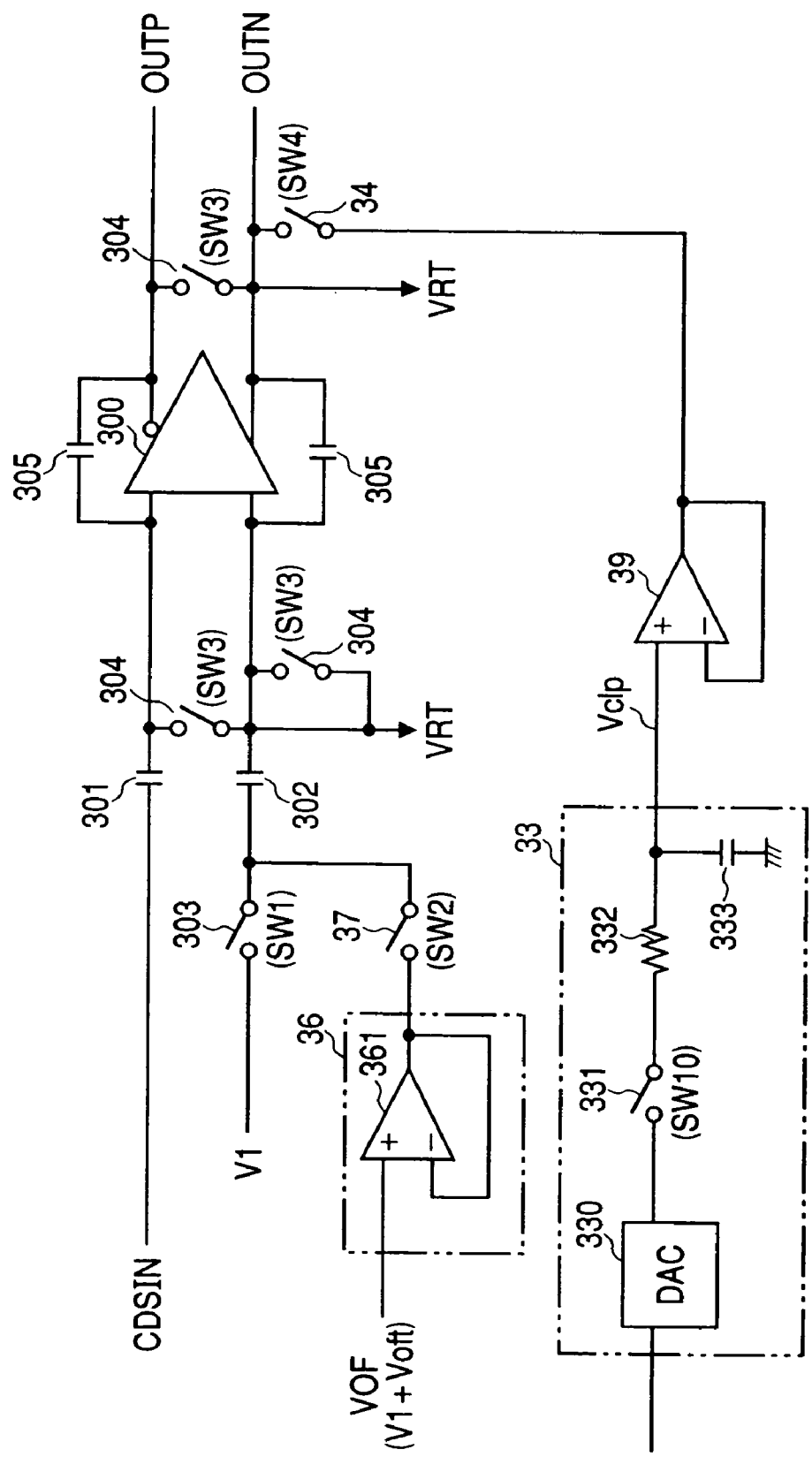
FIG. 7 is a circuit diagram showing an example of the CDS circuit, correcting means, and offset cancelling means.

FIG. 7 is a circuit diagram showing an example of the CDS 30, correcting means 35, and offset cancelling means 38. The components will be described in detail with reference to the diagram.

The CDS 30 has a differential input and differential output type differential amplifier 300, sampling capacitors 301 and 302, a sampling switch (SW1) 303, and a reset switch (SW3) 304. Reference numeral 305 denotes a capacitive element 305 for gain adjustment. The reset switch 304 is connected to a voltage VRT (such as Vdd/2). A voltage signal CDSIN from the CCD image pickup device 2 is supplied to the noninversion input terminal of the differential amplifier 300 via the sampling capacitor 301. A predetermined voltage V1 (arbitrarily predetermined voltage such as Vdd/2) is applied to the inversion input terminal of the differential amplifier 300 via the sampling switch (SW1) 303.

The feedback clamping voltage generating circuit 33 has: a DAC 330 for converting an output of the ADC 32 to an analog signal; a clamping voltage control switch 331 (SW10); a resistive element 332 for setting a time constant; and a capacitive element 333. The feedback clamping voltage Vclp is transmitted to the second addition switch circuit 34 (SW4) via the voltage follower amplifier 39 and is transmitted via the switch circuit 34 to the inversion output terminal OUTN of the differential amplifier 300.

The voltage VOF is transmitted to the second addition switch circuit 37 (SW2) via a voltage follower amplifier 361 and is applied to an accumulation electrode of the sampling capacitor 302. The voltage VOF is a voltage obtained by adding the predetermined voltage V1 to the offset cancelling voltage Voft for cancelling the offset voltage. Consequently, in the state where the CCD image pickup device 2 is optically interrupted, the voltage VOF corresponding to a voltage obtained by adding the predetermined voltage V1 to the offset cancelling voltage Voft for cancelling the offset voltage as a difference voltage between the black level and the reference signal level is outputted from the voltage follower amplifier 361.

Figure 8:
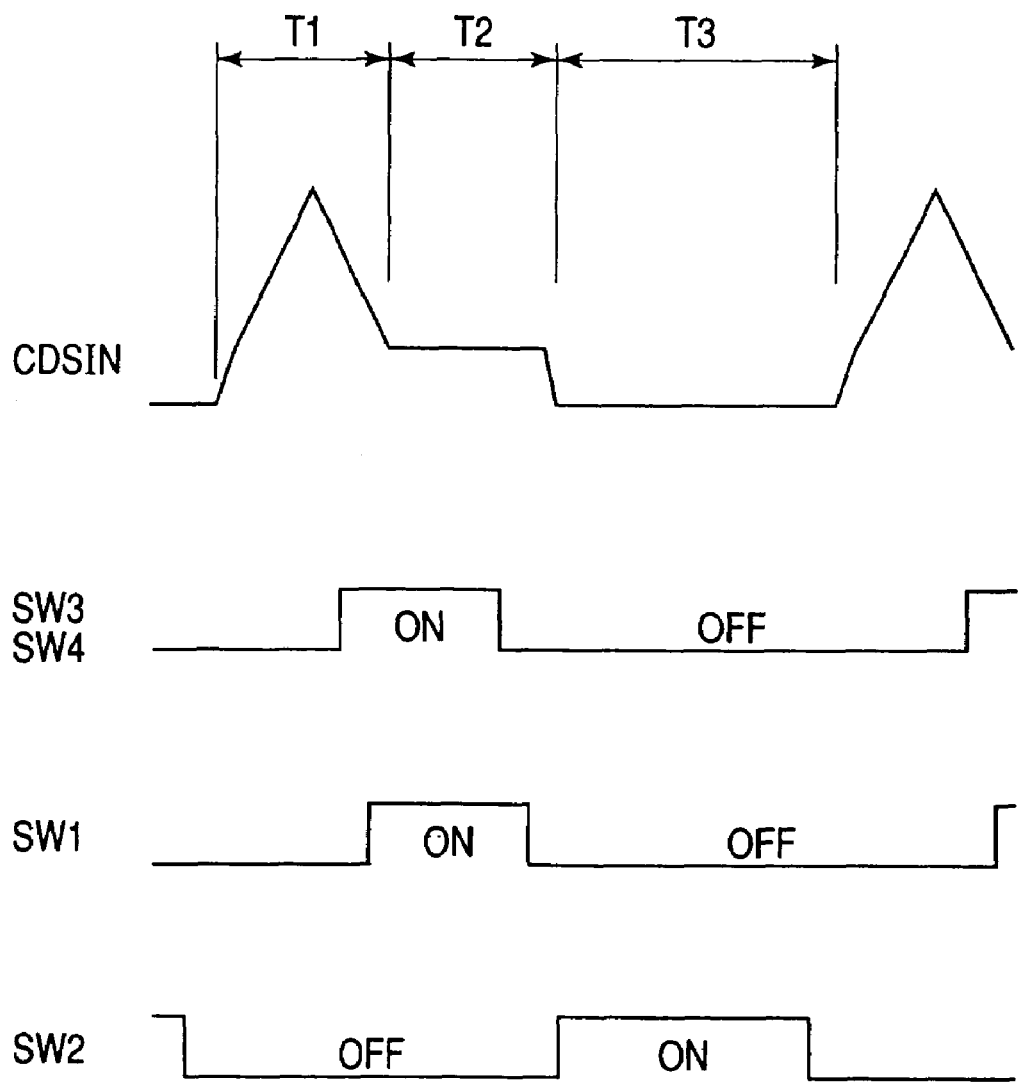
FIG. 8 is a waveform chart showing an example of the operation timing of the circuits illustrated in FIG. 7.

FIG. 8 shows an example of the operation timing of the circuit shown in FIG. 7. The state of the feedback clamping voltage Vclp is determined in the reference period by the clamping voltage control switch 331 (SW10) and is maintained in the following video period. In the video period, the switches SW3 and SW4 are put in the on state from the reset period T1 to the feedthrough period T2, so that the voltage VRT is obtained at both input terminals of the differential amplifier 300 and the noninversion output terminal OUTP and the inversion output terminal OUTN of the differential amplifier 300 are reset to the voltage VRT and the feedback clamping voltage Vclp. In parallel with the resetting operation, an output voltage of the CCD image pickup device 2 is applied to the sampling capacitive element 301 and the voltage V1 is applied to the sampling capacitive element 302 via the switch SW1, so that charges corresponding to each of the applied voltages are accumulated in each of the sampling capacitors 301 and 302. The difference between the voltage of the sampling capacitor 301 and the voltage of the sampling capacitor 302 in the state (or the output of the differential amplifier with respect to the difference) can be regarded as a signal voltage corresponding to the black level. When the operation shifts to the charge signal output period T3, the potential of the noninversion input terminal (+) of the differential amplifier 300 is changed in accordance with the change in the output signal CDSIN of the CCD image pickup device 2. In the change amount, the offset voltage of the CCD image pickup device 2 is also included. At this time, the witch SW2 is turned on and the potential of the noninversion terminal (−) of the differential amplifier 300 is changed only by an amount of the offset cancelling voltage Voft. The offset voltage applied to the noninversion input terminal (+) of the differential amplifier 300 is therefore cancelled out by the offset cancelling voltage Voft applied to the inversion input terminal (−). Consequently, the offset voltage component in the CCD image pickup device 2 is eliminated or reduced from the output of the differential amplifier 300.

The operations of the switches SW1 to SW4 are the same as the above also in the reference period. In this case, a process of updating the feedback clamping voltage by the switch 331 (SW10) is performed. Since the offset voltage has a magnitude peculiar-to the CCD image pickup device 2, it is considered that substantial fluctuation hardly occurs after the initial setting unless a large temperature change or the like occurs. After the initial setting, therefore, only the feedback clamping voltage is updated but it is unnecessary to update the offset cancelling voltage.

Figure 9:
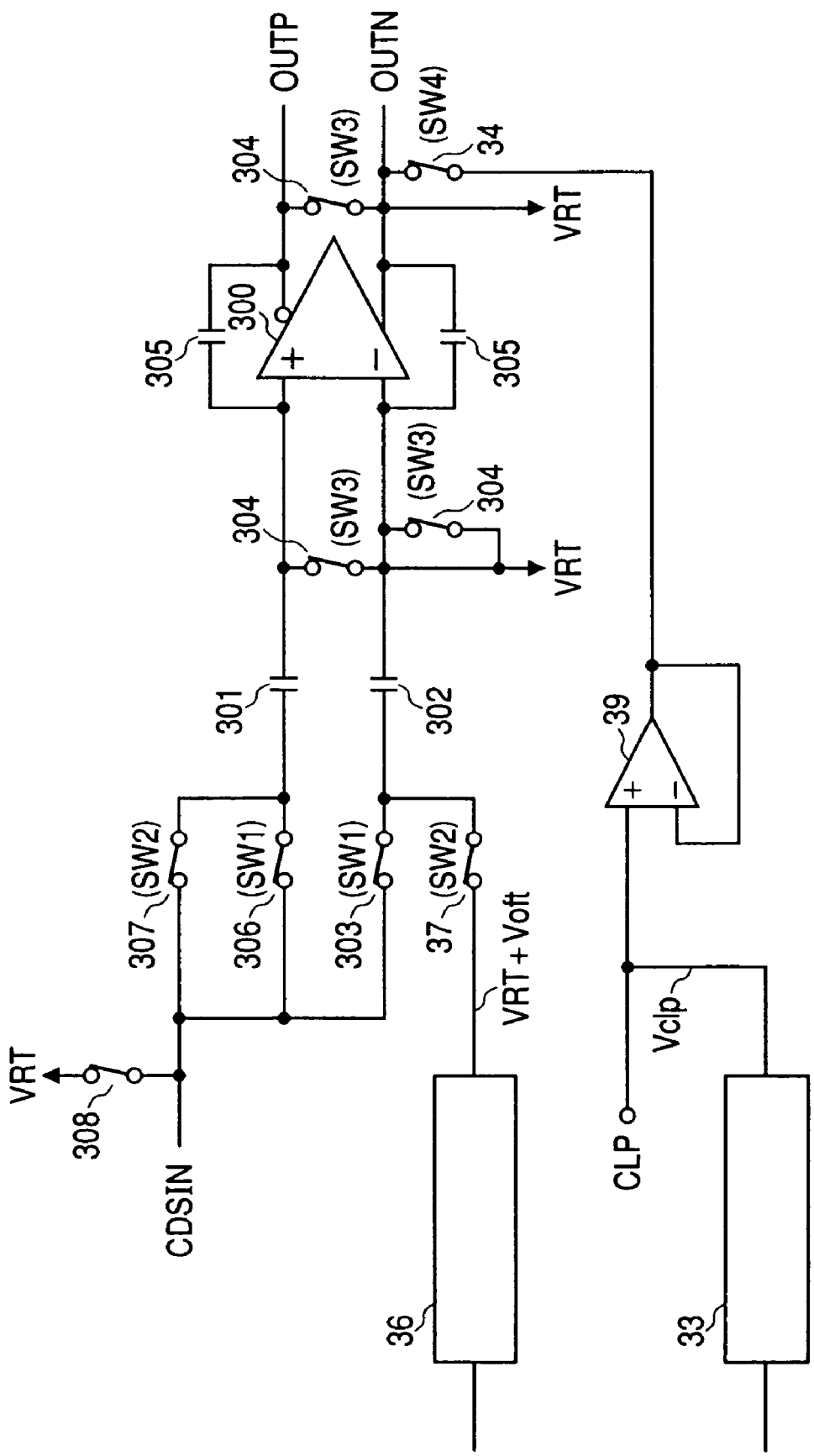
FIG. 9 is a circuit diagram showing another example of the CDS circuit.

FIG. 9 shows another circuit of the CDS 30. In FIG. 9, the voltage signal CDSIN from the CCD image pickup device 2 is applied to the sampling capacitors 301 and 302 via the switches 303, 306, and 307. The voltage VRT is selectively applied to the sampling capacitors 301 and 302 via the switch 308. In FIG. 9, the voltage generated by the offset cancelling voltage generating circuit 36 is equal to VRT+ Voft. The other configuration is similar to that of FIG. 7. The switches SW1 to SW4 in the circuit shown in FIG. 9 are turned on at the same timing as that of FIG. 8. The switch 308 is turned on simultaneously with the switch SW1 in the reference period. In the circuit configuration, for example, VRT theoretically corresponds to the black level.

Figure 10:
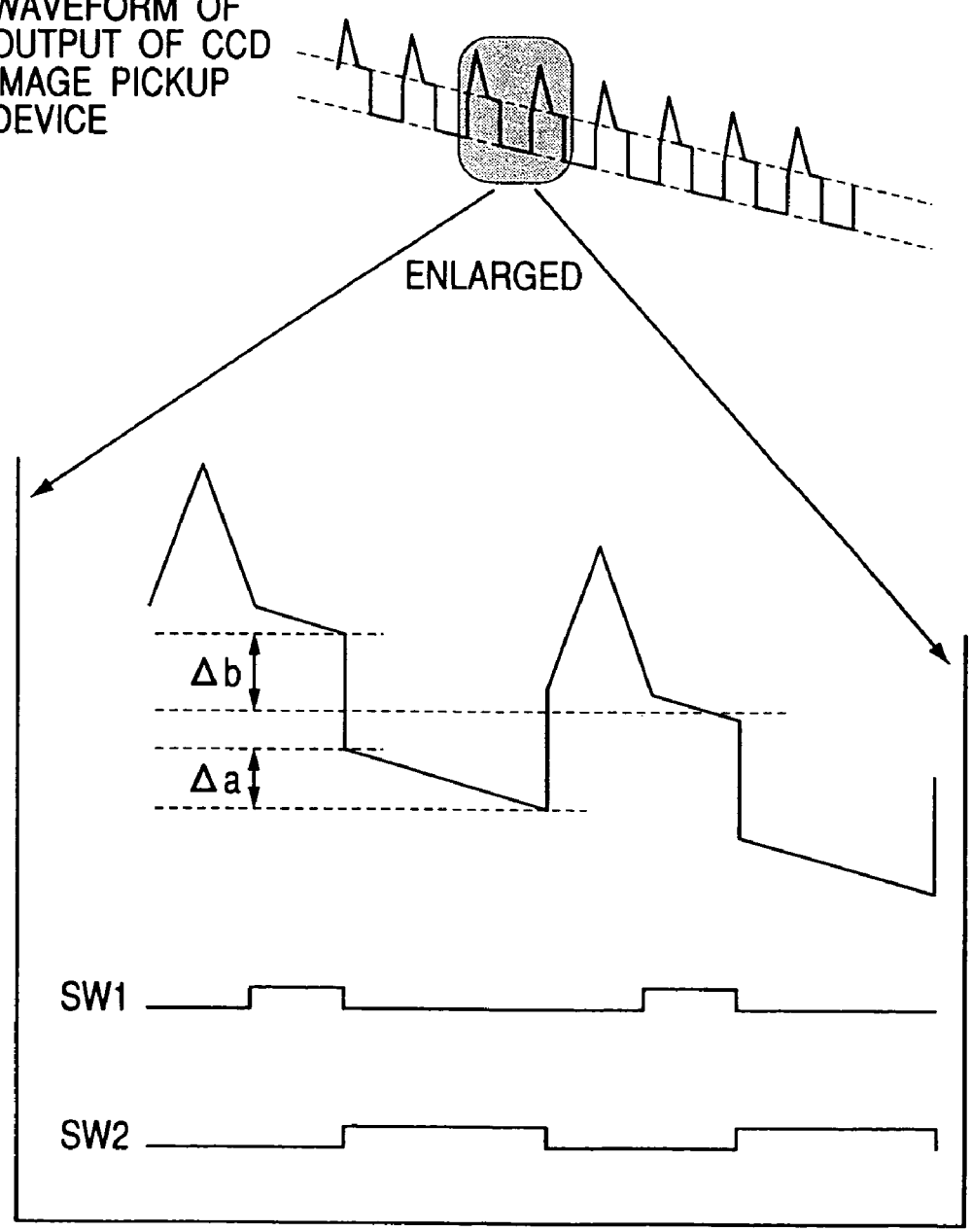
FIG. 10 is an explanatory diagram of shading.

The circuit of FIG. 7 is compared with that of FIG. 9. A shading distortion in the circuit of FIG. 7 is smaller. The shading is a phenomenon such that an image becomes dark near the proximal side in the horizontal scan direction when an image is inputted by using the CCD image pickup device 2. As shown in FIG. 10, the output voltage signal waveform of the CCD image pickup device 2 is inclined as a whole to the proximal side in the horizontal scan direction. In the circuit configuration of FIG. 9, the output voltage signal CDSIN of the CCD is applied to the sampling capacitors 301 and 302 in both the feedthrough period T2 and the charge signal output period T3. Consequently, Δa+Δb in FIG. 10 corresponds the shading distortion. In the case of FIG. 7, since the output voltage signal CDSIN of the CCD is not applied to the sampling capacitor 302, only Δa in FIG. 10 corresponds to the shading distortion.

Figure 11:
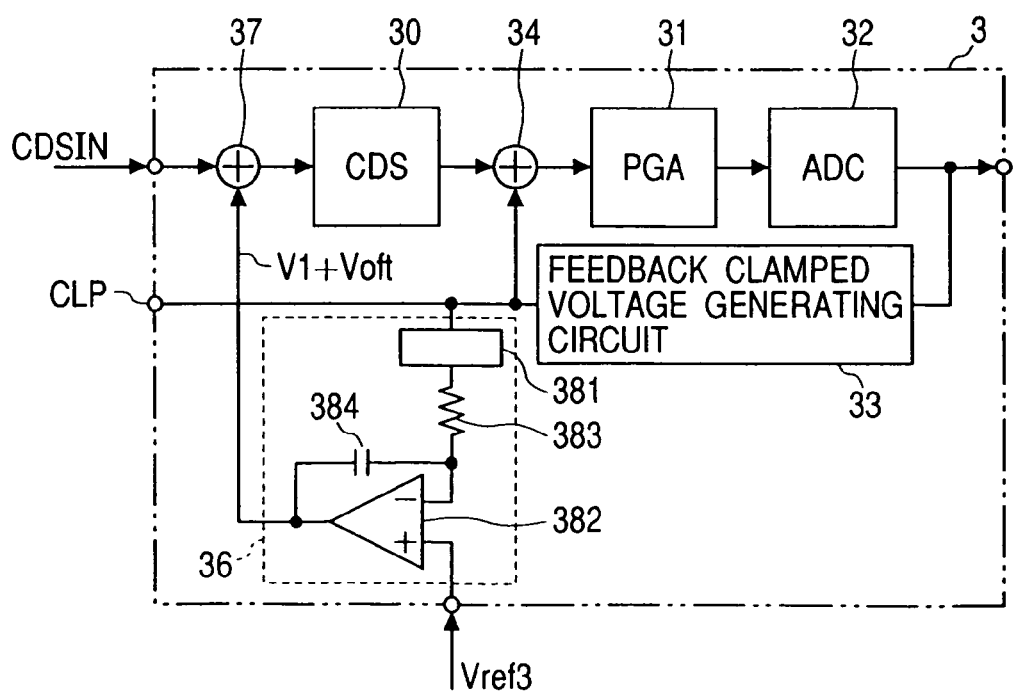
FIG. 11 is a circuit diagram showing a second example of the offset cancelling means.

FIG. 11 shows a second example of the offset cancelling means. In FIG. 11, the offset cancelling voltage generating circuit 36 comprises a sample and hold circuit 381 for sampling a clamping voltage Vclp generated by the feedback clamping voltage generating circuit 33; and an inverting amplifier 382 for generating a voltage obtained by adding a voltage V1 to the offset cancelling voltage Voft by a difference voltage between the voltage signal sampled by the sample and hold circuit 381 and a reference voltage signal Vref 3 (theoretical clamping voltage). An output of the inverting amplifier 382 is selectively applied to the input stage of the CDS 30 via the second addition switch circuit 37. A resistive element 383 is coupled between an output of the sample and hold circuit 381 and an inverting input terminal (−) of the inverting amplifier 382, and a capacitive element 384 is coupled between the inverting input terminal (−) and the output of the inverting amplifier 382. The other configuration in FIG. 11 is similar to that of FIG. 6. The circuit blocks having the same function are designated by the same reference numerals and its detailed description is omitted here. The offset cancelling means shown in FIG. 11 can automatically cancel the offset voltage by the feedback control in a manner similar to FIG. 6. Consequently, the feedback voltage control amount can be further reduced and the voltage can be accordingly decreased. A change with time in the temperature characteristic of the offset voltage or the like can be also cancelled.

Figure 12:
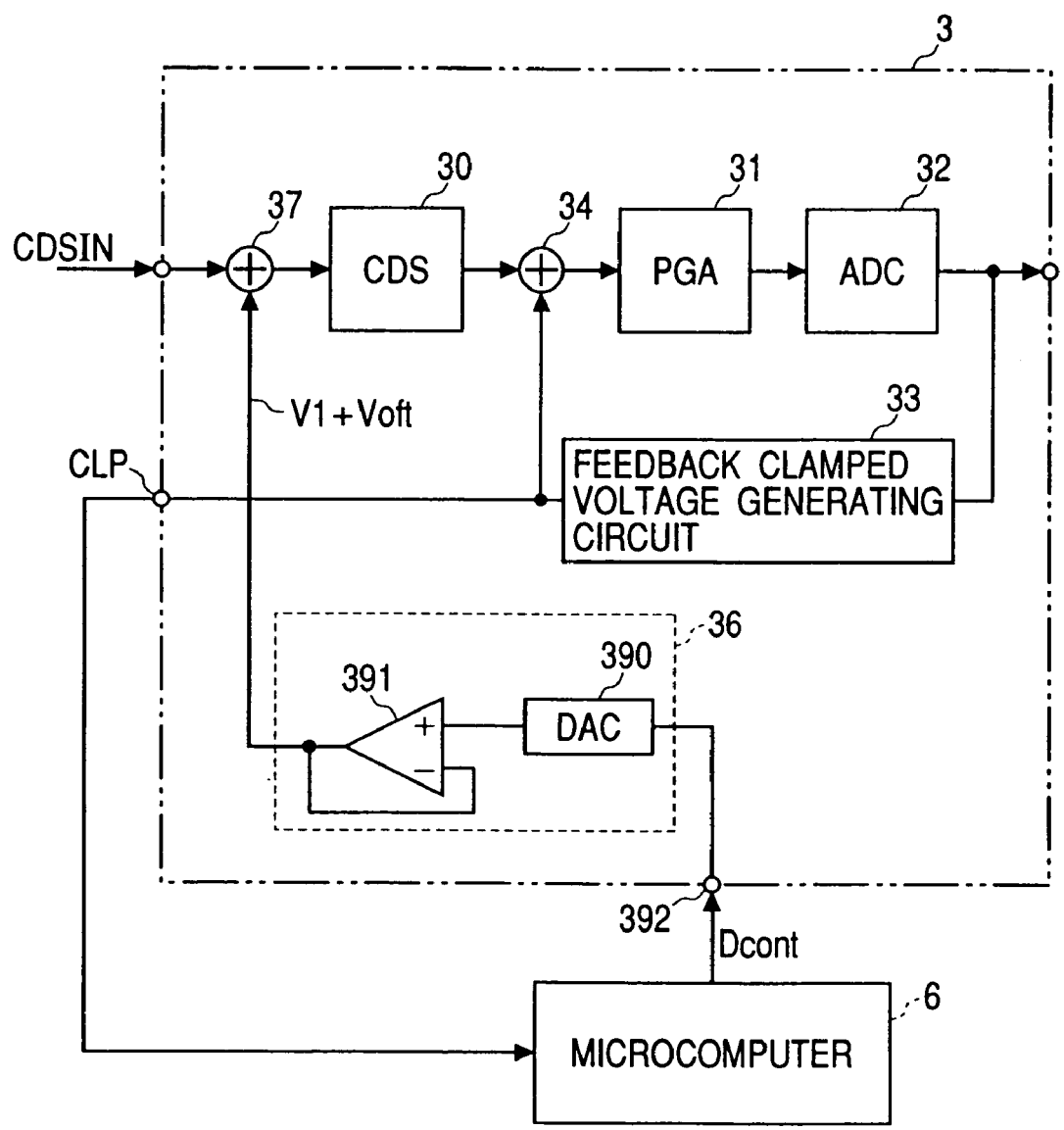
FIG. 12 is a circuit diagram showing a third example of the offset cancelling means.

FIG. 12 shows a third example of the offset cancelling means. In FIG. 12, the offset cancelling voltage generating circuit 36 comprises: an external terminal 392 to which digital control information Dcont for designating the level of the offset cancelling voltage is supplied in the state where the CCD image pickup device 2 is optically interrupted; a D/A converter (DAC) 390 for converting the supplied digital control information Dcont to an analog signal and generating a voltage obtained by adding the predetermined voltage V1 to the offset cancelling voltage Voft; and a voltage follower circuit 391 for receiving an output of the DAC 390. The offset cancelling voltage generating circuit 36 applies the generated voltage V1+Voft to the input stage of the CDS 30 via the second addition switch circuit 37. The other configuration in FIG. 12 is similar to that of FIG. 6. The circuit block having the same function is designated by the same reference numeral, and the detailed description is omitted here. According to the offset cancelling means shown in FIG. 12, no sample and hold circuit is necessary. The offset cancelling voltage generating circuit 33 can generate the voltage V1+Voft for cancelling the offset by a digital signal.

In the case of employing the offset cancelling means shown in FIG. 12, in order to grasp whether the control information Dcont inputted from the outside is a proper value or not, it is sufficient to monitor whether the voltage at a monitor terminal CLP becomes a theoretical specified voltage or not in the reference period. For example, as shown in FIG. 12, the microcomputer 6 can output data Dcont by referring to the voltage at the monitor terminal CLP.

Although the invention achieved by the inventors has been described specifically on the basis of the embodiments, the invention is not limited to the embodiments but can be variously modified without departing from the spirit and scope of the invention.

For example, the CCD image pickup device is not limited to the interline type. A frame interline type in which a CCD is provided with a frame storing unit, a frame transfer type having a transfer unit which also serves as a photoreceiver, and the like may be also used. The invention can be also applied to an image input system using a solid state image pickup device of an X-Y address type using MOS transistors. The feedback clamping voltage may be also fed back to the output side of the PGA. When the correction amount is large, however, it is desirable to feed back the feedback clamping voltage to the front stage of the PGA as in the foregoing embodiments.

INDUSTRIAL APPLICABILITY

The invention can be widely applied to an image input system for optically inputting an image, such as a digital video camera, a digital still camera, or a digital endoscope.

The invention claimed is:

1. A semiconductor integrated circuit device for use with a solid state image pickup device, the semiconductor integrated circuit device comprising:

a correlated double sampling amplifier which receives an image signal from the solid state image pickup device and amplifies a difference voltage between a black level in a feedthrough period of the solid state image pickup device and a signal level in a charge signal output period, a gain control amplifier which receives an output signal from the correlated double sampling amplifier and amplifies the output signal from the correlated double sampling amplifier, an A/D converter which receives an output signal from the gain control amplifier and converts the output signal from the gain control amplifier to a digital video signal, an offset cancelling circuit which applies an offset cancelling voltage for cancelling an offset voltage corresponding to an offset in regard to an output of the solid state image pickup device to an input terminal of the correlated double sampling amplifier; and a correction circuit which detects the difference voltage between the black level in the feedthrough period of the solid state image pickup device in the state where the solid state image pickup device is optically interrupted and the signal level in the charge signal output period where the solid state image pickup device is optically interrupted, generates a feedback clamp voltage based on the detected difference voltage, and then applies the feedback clamp voltage to a signal line between the correlated double sampling amplifier and the A/D converter.

* * * * *